March 2, 1943.　　　　J. A. ORR　　　　2,312,972
GRASS AND WEED CUTTER
Filed June 21, 1941　　　2 Sheets-Sheet 1

Inventor
John Alexander Orr
By H. J. Sanders
Atty.

March 2, 1943.　　　　J. A. ORR　　　　2,312,972
GRASS AND WEED CUTTER
Filed June 21, 1941　　　2 Sheets-Sheet 2

Inventor
John Alexander Orr
By H.J. Sanders
Atty.

Patented Mar. 2, 1943

2,312,972

UNITED STATES PATENT OFFICE 2,312,972

GRASS AND WEED CUTTER

John Alexander Orr, Chicago, Ill.

Application June 21, 1941, Serial No. 399,063

4 Claims. (Cl. 56—25.4)

This invention relates to improvements in lawn mowers and weed cutters and one object is to provide a machine of this type wherein the frame, blade guards and transmission mechanism are disposed in advance of the supporting wheels and of the axle while the motor is slightly offset above this axle so that its weight serves to counterbalance the weight of the first named parts thus making the machine very readily portable, easy to guide and to move forward, backward or to turn corners or to pivot about upon one wheel while cutting thus to permit access to corners or other spots ordinarily difficult to reach.

It has been found that when using machines of this general type over ground that is somewhat rough the blade may dig into the ground when one supporting wheel rides into a rut or over a small ridge or hill of earth. In the present machine, however, such is not the case due to the presence of a substantially disc-like slide plate or shoe disposed below the cutting blade that serves as a guard to at all times space the blade above the ground regardless of the pitch or uneven movement of the machine over somewhat rough ground.

This slide plate or shoe is so shaped and positioned with respect to the cutting blade, however, that clearance is provided for its cutting engagement with grass, weeds, or the like whether the machine is moved forwardly, backwardly, on a curve or turned partly or completely about one wheel as a pivot. This plate or guard is not provided with teeth as it has been found that the presence of teeth peripherally of such a plate prevent the cutting operation when the machine is moved pivotally or on a sharp curve. Further it has been found that wheels other than the two large wheels disposed immediately back of the slide and blade are detrimental and that rollers beneath or otherwise associated with the structure are an hindrance as they tend to press down the grass or other material before it can be encountered by the blade. While the guard plate or shoe does not serve exactly as a runner it is capable of sliding contact with the ground at the will of the operator or when the machine encounters ground irregularities and during such sliding contact it prevents contact of the blade with the ground or "digging in" of the blade.

The machine includes among its objects to provide a protective overhead or "umbrella" guard for the blade of slightly greater diameter than the length of the blade but which is formed with an adjustable or removable forward section or portion which is displaced when the machine is used for cutting weeds, and an arcuate downturned rear portion extending below the plane of the blade to prevent the possibility of hurling small stones or like objects when encountered by the same and which might otherwise cause injury to the operator or someone nearby.

The rotary cutting blade is disposed between the slide plate or shoe and overhead guard and is carried by a rotary transmission shaft with which it rotates yieldingly so that should the blade strike an unyielding object the shaft could rotate while the blade movement was arrested, the shaft engaging the blade at its longitudinal center which point lies in a straight line midway between the wheels, the length of the blade being such that its cutting ends extend slightly beyond the path of the supporting wheels to cut a path for the same as the machine advances over the ground. The frame of the machine is adjustably supported by its wheels to permit the knife to be raised or lowered with respect to the ground line. The slide plate or shoe may be of various shapes so long as its outer edge or edges are spaced inwardly from the ends of the blade. A round plate or shoe is preferred but of lesser diameter than the length of the blade.

With the foregoing and other objects in view the invention consists in the combination and arrangement of parts to be hereinafter fully described, pointed out in the claims and illustrated in the accompanying drawings, in which—

Like reference characters denote corresponding parts throughout.

Figure 1:
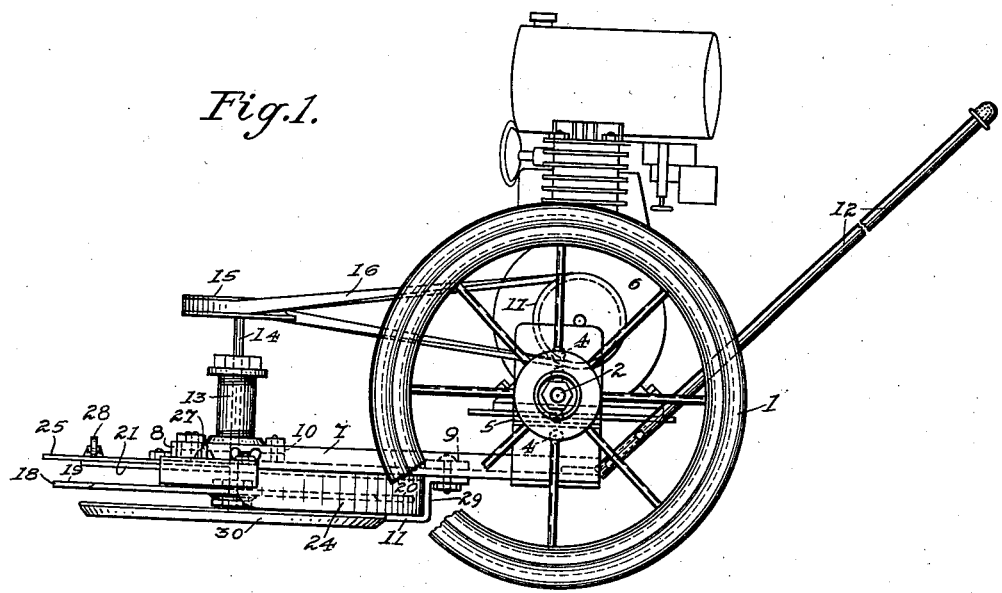
Fig. 1 is a view of the present lawn mower or grass cutter and weed cutter in side elevation.

The reference numeral 1 denotes the supporting wheels each of which is provided with a stub axle 2 to which the upright castings 3 are adjustably secured, each casting being formed with a plurality of perforations 4, preferably three, through which said axles selectively extend to permit the castings to be adjusted vertically. Welded or otherwise secured to, or integral with, the castings is the frame bed 5 that carries the motor 6 that is offset slightly to the rear of the stub axles. Extending forwardly from the bed of the frame are the converging frame sides 7 connected by the front end 8, by a brace 9 and forwardly thereof by a platform 10 that rests also upon a span 11 extending longitudinally of the frame from the brace 9 beyond the front end 8.

Welded or otherwise secured to the bed of the frame is the handle 12 by means of which the machine is propelled and directed by the operator. Arranged upon the platform 10 is the standard 13 that operatively carries the transmission shaft 14 driven by the pulley 15 operatively connected by the belt 16 to the driving pulley 17 fast upon the motor shaft. The shaft 14 extends through the platform and carries upon its lower end the rotary blade 18 having sharpened edge portions 19, 20 formed upon diagonally opposite edges, said blade being operatively secured to the shaft 14 in such manner as to yieldingly permit blade arrest while permitting shaft rotation in the event the blade should meet some unyielding object, this structure being fully set forth in my Patent #2,232,261, of February 18, 1941.

Secured to and preferably against the under side of the forward portion of the frame is an overhead guard plate 21 substantially round and flat in shape but with a recessed forward peripheral edge 22 whereby oppositely disposed shoulders 23, 23 are formed and with a downturned substantially semi-circular rear edge 24 that extends below the plane of the knife 18 forming a guard to prevent the knife from "throwing" small objects rearwardly.

Figure 2:
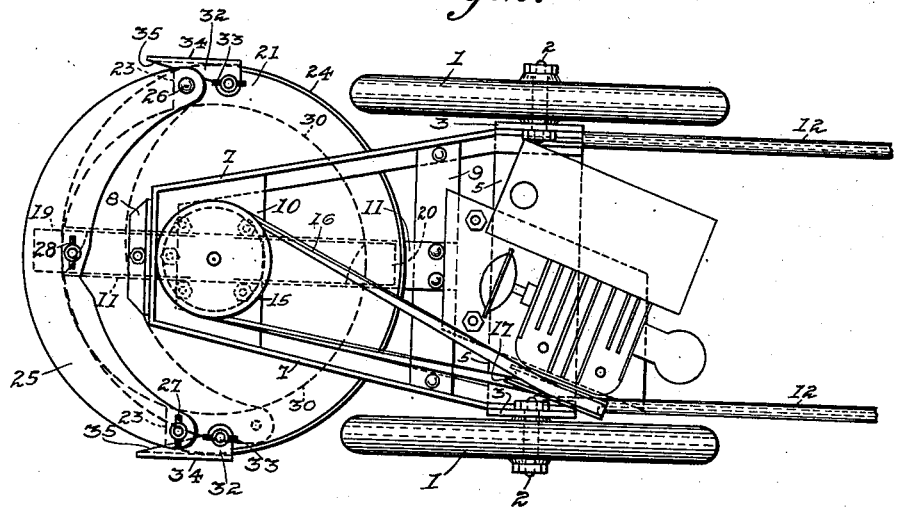
Fig. 2 is a top plan view of Fig. 1.
Figure 3:
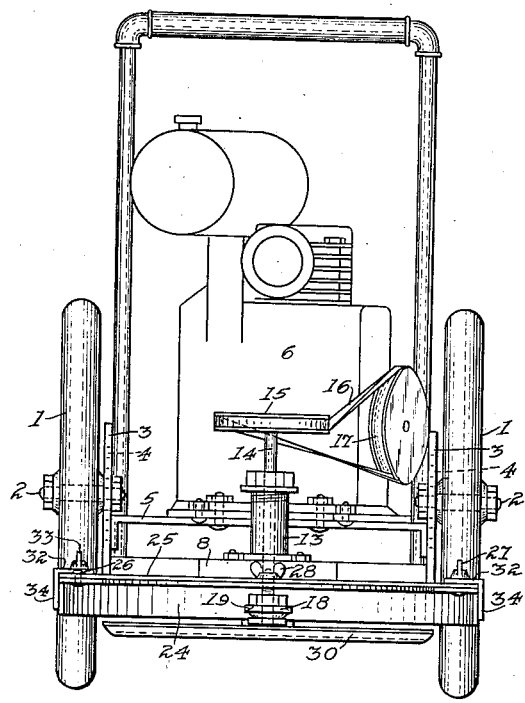
Fig. 3 is a view of the machine in front elevation.
Figure 5:
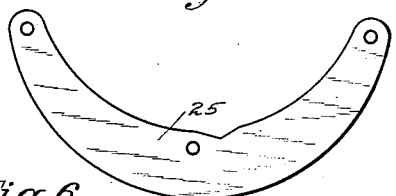
Fig. 5 is a plan view of a detachable or adjustable guard employed.
Figure 6:
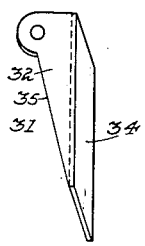
Fig. 6 is a view in perspective of a type of lateral hook or guard employed.
Figure 4:
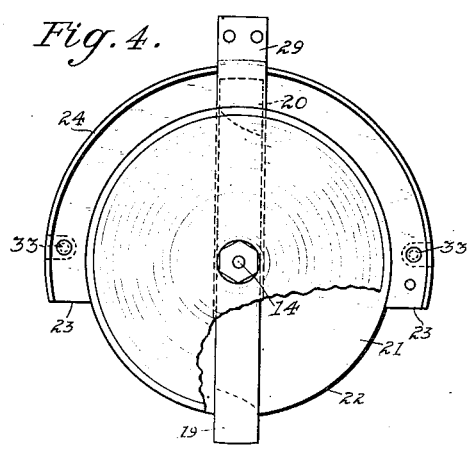
Fig. 4 is a fragmentary inverted plan view of the machine showing the rotary blade and the top and bottom guards therefor, the bottom guard being partly broken away.

Removably and adjustably secured to the top face of the guard plate 21 and extending along and beyond the recessed edge thereof is the segmental apron 25, one end thereof being pivotally secured by a pin 26 to plate 21 just rearwardly of one shoulder 23 and the opposite end of said apron being removably secured by a wing nut 27 to said plate adjacent the other shoulder 23, a second wing nut 28 removably securing said apron to the frame span 11, said apron in operative position extending forwardly beyond the path of movement of the blade to serve as a guard therefor to prevent it from striking trees, bushes, etc. while cutting and to prevent small objects struck accidentally from being thrown upwardly and outwardly in a possibly dangerous manner. During certain uses of the machine, such as in cutting high standing weeds, stalks and the like the wing nuts 27, 28 are removed and the apron either lifted completely off the machine or it may be moved about the pin 26 into an out of the way position, as shown in dotted lines in Fig. 2, to provide greater freedom of operation of the blade.

Disposed beneath the blade in spaced relation thereto and supported a very slight distance above the ground line by a bracket 29 connecting it to the frame is a substantially round shoe or disc 30 which is preferably flat except for a slightly upturned forward edge, or with an upturned peripheral edge all around, to permit it to ride upon and over small ground ridges or irregularities to raise the blade out of otherwise possible contact therewith, this shoe being adapted to ride into ground depressions also and to prevent the rotating blade from otherwise possible engagement with the sides thereof or with the ground thereabout while permitting it to effectually follow the ground topography and cut the growing material. It will be noted that this shoe is effective whether the machine is moved forwardly, rearwardly, laterally, obliquely or pivotally. By adjustment of the castings 3 upon the stub axles 2 the entire frame and connections are, of course, adjusted relative to the ground line. Secured to opposite lateral edges of the plate 21 by bolts and wing nuts 33 are the guard ears or hooks 31 having oppositely disposed spaced lateral flanges 32 adapted to extend above and below the plates 21 and to be connected by said bolts and nuts 33 thereto, said hooks having outwardly disposed flat faces 34 adapted to ride alongside or against an object such as a wall.

The said flanges 32 are beveled inwardly as at 35 from one end of said flat face toward the path of movement of the blade to guide standing grass or like material into the path of the rotating blade.

What is claimed is:

1. In a grass and weed cutter, a blade, a shoe operatively supported below said blade, a guard plate immediately above said blade, and a drop flange depending from said plate cutting the plane of said blade.

2. In a grass and weed cutter, a rotary blade, a shoe operatively supported below said blade, said shoe being spaced inwardly from the ends of said blade, an overhead plate for said blade, and a flange depending from said plate rearwardly thereof and in spaced relation to said blade.

3. In a grass and weed cutter, a rotary blade, driving means therefor, a shoe arranged below said blade of lesser width than the length of said blade, an overhead plate for said blade, the forward edge of said plate being recessed to clear the cutting edge of said blade, and a flange depending from the rear end of said overhead plate in spaced relation to the ends of said blade.

4. In a grass and weed cutter, a rotary blade, a shoe arranged beneath said blade, a plate above said blade, the forward edge of said plate being spaced inwardly from the ends of said blade in their foremost position, and an apron adjustably and removably secured to the forward edge of said plate to extend the same beyond said blade ends in their said forward position.

JOHN ALEXANDER ORR.